United States Patent [19]

Mariani et al.

[11] Patent Number: 4,889,399

[45] Date of Patent: Dec. 26, 1989

[54] EXPANDED BEAM CONNECTOR FOR OPTICAL FIBERS

[75] Inventors: Beniamino Mariani, Vendano al Lambro; Bruno Bortolin, Cinisello Balsamo, both of Italy

[73] Assignee: Società Cavi Pirelli S.p.A., Milan, Italy

[21] Appl. No.: 262,976

[22] Filed: Oct. 26, 1988

Related U.S. Application Data

[63] Continuation-in-part of Ser. No. 249,784, Sep. 27, 1988, Pat. No. 4,846,544.

[30] Foreign Application Priority Data

Oct. 29, 1987 [IT] Italy ................................ 22447 A/87

[51] Int. Cl.⁴ .............................................. G02B 6/36
[52] U.S. Cl. ................................. 350/96.2; 350/96.18
[58] Field of Search ............... 350/96.18, 96.2, 96.21

[56] References Cited

U.S. PATENT DOCUMENTS

| | | | |
|---|---|---|---|
| 4,265,511 | 5/1981 | Nicia et al. ........................ | 350/96.18 |
| 4,632,505 | 12/1986 | Allsworth ........................ | 350/96.21 |
| 4,639,076 | 1/1987 | Mikolaicyk et al. ......... | 350/96.18 X |
| 4,690,487 | 9/1987 | Hale et al. ........................ | 350/96.21 |
| 4,807,958 | 2/1989 | Gunner et al. .................... | 350/96.21 |

*Primary Examiner*—John D. Lee
*Assistant Examiner*—John Ngo
*Attorney, Agent, or Firm*—Brooks Haidt Haffner & Delahunty

[57] ABSTRACT

An optical fiber expanded beam connector in which a spherical lens is held between a conical seat on a sleeve and a conical seat on a support for the bared optical fiber, the support being within the sleeve and having an external diameter less than the internal diameter of the sleeve to provide clearance therebetween which permits the support to move radially with respect to the axis of the sleeve. The fiber with its covering is secured to a body within the sleeve, the body being secured to the sleeve. In one embodiment, the support is a ferrule within a bushing which is secured to the body, the length of the bushing from the conical seat being large relative to the radial thickness of the clearance. In another embodiment, the support is a ferrule urged toward the lens by a spring between the ferrule and the body.

10 Claims, 1 Drawing Sheet

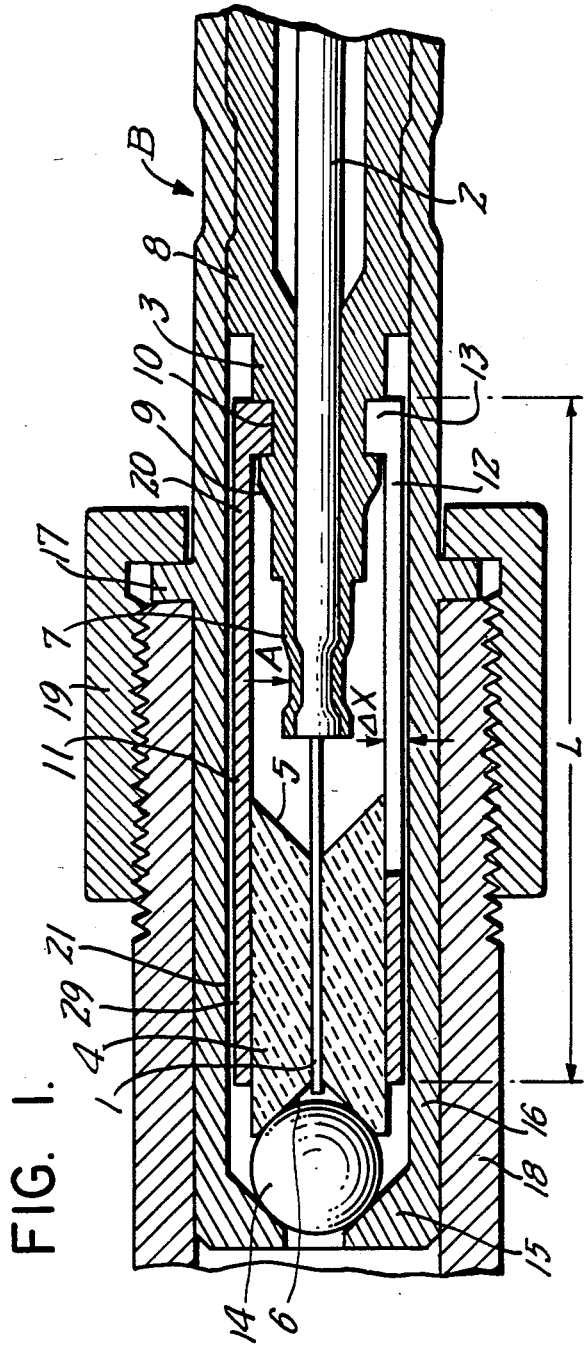
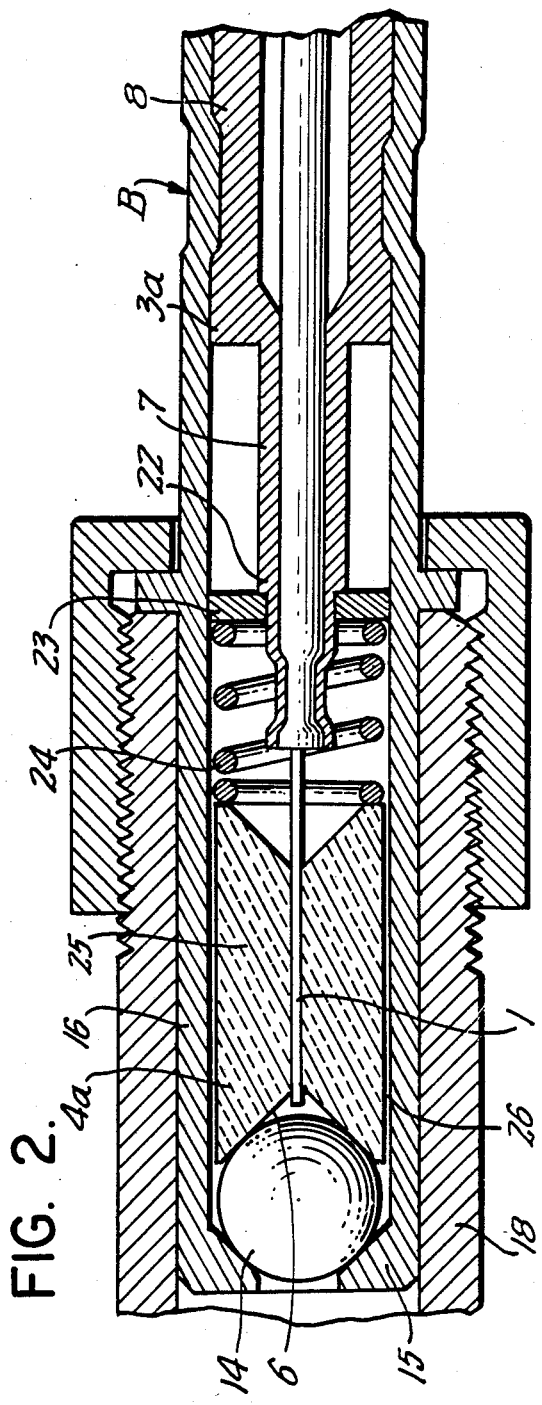

EXPANDED BEAM CONNECTOR FOR OPTICAL FIBERS application is a continuation-in-part of our copending application Ser. No. 07/249,784 filed Sept. 27, 1988 which has allowed (the U.S. Pat. No. 4,846,594) and entitled "Method of Interconnecting Optical Fiber Cables and Connector Therefor".

The present invention relates to an expanded beam type connector for optical fibers.

It is known that the main purpose of a connector for optical fibers is that of ensuring the best possible continuity between the optical signals which pass from one part of a connector to the other part of the connector. To reach this result, in particular in the expanded beam type connectors, it is necessary for the lenses and the optical fibers to be perfectly aligned with one another and for the ends of the optical fibers to be positioned at the foci of said lenses. A connector of the type to which the invention relates is described in application Ser. No. 050,061 filed May 13, 1987 which has been allowed (the U.S. Pat. No. 4,807,958), entitled "Method of Interconnecting Optical Fiber Cables and Connector Thereof" and assigned to the assignee of the application.

The alignment between the lenses and the optical fibers is generally obtained by using cylindrical ferrules, provided with very precise central holes, having substantially the same diameter as the optical fibers, the ends of which have conical recesses.

The inner conical recess of the ferrule facilitates the insertion of the optical fiber in the ferrule itself, while the outer conical recess serves to house and to center the coupling lens, having a spherical shape, with respect to the ferrule central hole.

The ferrule and the coupling lens are inserted under pressure into a cylindrical sleeve, terminating with a retaining ring, which fastens the spherical coupling lens in the outer conical recess of the ferrule Finally, the sleeve is inserted into a coupling tube, so that the lens is facing the corresponding lens of the other sleeve.

According to this solution, the ferrule allows the centering of the spherical lens in its outer conical recess, while the alignment between the ferrule and the sleeve is ensured by the very close connection between the ferrule and the sleeve.

However, such solution has some disadvantages.

First of all, to ensure the alignment between the ferrule and the sleeve, the ferrule outer surface and the sleeve inner surface must be formed with the utmost precision and with very reduced tolerances which involves long working times and high costs.

Secondly, during its positioning, the spherical lens may be in contact with the retaining ring of the sleeve along a circumference and with the outer conical recess of the ferrule only at one point which results in the lens being unbalanced and not perfectly centered with respect to the optical fiber and causes a consequent attenuation of the optical signal transmitted.

The present invention has, as one object, the overcoming of the above indicated disadvantages and limitations of the conventional technique by providing a connector for optical fibers of the expanded beam type which is simple and inexpensive and which allows the ferrule to effect movements with respect to the sleeve in order to have at any moment an optimum centering of the spherical lens with respect to the ferrule.

To achieve this object, the connector of the present invention comprises a hollow cylindrical body intended to receive an optical fiber, a cylindrical supporting element provided with a central hole intended to receive the terminal portion of the optical fiber devoid of its coverings and having an outer conical recess, a spherical lens inserted in the outer conical recess of said cylindrical supporting element, a cylindrical sleeve provided in its front part with a conical retaining ring and encircling the lens, the cylindrical supporting element and the hollow body, and a coupling tube wherein the sleeve is inserted, characterized in that said cylindrical supporting element has an outer diameter which is smaller than the inner diameter of the sleeve so that a clearance is created between the cylindrical supporting element and the sleeve which allows the cylindrical supporting element to effect movement with respect to the sleeve.

In a first embodiment, the cylindrical supporting element is constituted by a ferrule, and a spring which keeps the hollow body and the spherical lens in position is inserted between the rear part of the ferrule and the front part of the hollow body.

In a second embodiment, the cylindrical supporting element is formed by a ferrule inserted into a bushing having an outer diameter smaller than the inner diameter of the sleeve so that the clearance is created between the bushing and the sleeve.

Preferably, the ratio between the thickness of the clearance between the bushing and the sleeve and the length of the bushing ranges between $10^{-3}$ and $10^{-2}$.

Other objects and advantages of the present invention will be apparent from the following detailed description of the presently preferred embodiments thereof, which description should be considered in conjunction with the accompanying drawings in which:

FIG. 1 illustrates in longitudinal section one-half of a connector for optical fibers of the expanded beam type according to a first embodiment of the invention, and FIG. 2 illustrates in longitudinal section one-half of a connector for optical fibers of the expanded beam type according to a second embodiment of the present invention.

FIG. 1 illustrates an optical fiber 1 provided with an adherent protective covering 2 of nylon and inserted into a hollow cylindrical body 3 made of metal, such as, for instance, brass.

The bare portion of the optical fiber 1 is inserted in the central hole of a cylindrical ferrule 4, which has an inner conical recess 5 and an outer conical recess 6.

The hollow cylindrical body 3 has a front part 7 of an outer diameter smaller than the outer diameter of its rear part 8.

At the front part 7 of smaller diameter, the hollow body 3 has a chamfer 9 and an annular recess 10. The ferrule 4 is inserted in the front part 29 of a metal bushing 11, made, for instance, of brass. The metal bushing 11 has a length L of 15 mm, and has, at its rear part 20, a series of longitudinal slots 12 which provide elastic fingers with projecting portions 13 which fit into the recess 10 for axially retaining the bushing 11.

The outer conical recess 6 of ferrule 4 contains a spherical lens 14 kept in position by means of a retaining ring 15, of inner conical shape, the ring 15 being part of a metal sleeve 16, made, for instance, of brass.

The outer diameter of bushing 11 is smaller than the inner diameter of sleeve 16, so as to leave a clearance 21 between the two components. The thickness ΔX of clearance 21 is 0.05 mm.

Sleeve 16 is provided with an annular ridge 17 which abuts against the end of a coupling tube 18 into which said sleeve 16 is inserted.

The anchorage of the sleeve 16 to the coupling tube 18 is carried out by means of a ring nut 19 having an internal thread which meshes with a corresponding thread provided on the outer surface of said coupling tube 18.

In the assembling operation, the ferrule 4 is first inserted in the front part 29 of the bushing 11. Then, the optical fiber is inserted in the hollow body 3 and its adherent protective covering 2 is crimped by means of clamping pliers in the zone indicated with arrow A.

The bare optical fiber 1 is then inserted in the central hole of ferrule 4 and at the same time, with the aid of the chamfer 9 and of the longitudinal notches 12, the projecting portions 13 of the bushing 11 are inserted in the annular recess 10 of the hollow body 3.

Then, the spherical lens 14 is positioned in the outer conical recess 6 of the ferrule 4 and the sleeve 16 is inserted on the bushing 11 until its retaining conical ring 15 abuts against the spherical lens 14, centering it and keeping it in position in the outer conical recess 6 of the ferrule 4.

At this time, a pressure is exerted by clamping pliers on the zone indicated with arrow B, and the sleeve 16 is secured to the hollow body 3.

Finally, the sleeve 16 is inserted in the coupling tube 18 until the annular ridge 17 abuts the end of the tube 18 and, by means of the threaded ring nut 19, said sleeve 16 is fastened to the coupling tube 18.

In a similar manner, another optical fiber is coupled to the optical fiber by a sleeve 16, etc., similar to that illustrated, which is inserted in the opposite part of the coupling tube 18, thus obtaining the alignment and the connection of the optical fibers.

The outer surface of sleeve 16 and the inner surface of the coupling tube 18 are very accurately made, and this ensures an optimum alignment of sleeve 16 in the coupling tube 18.

Further, the conical surface of the retaining ring 15 and the outer conical recess 6 of the ferrule 4 are formed with the utmost precision.

As a consequence, the retaining ring 15 exactly centers the spherical lens 14 and this, in turn, perfectly aligns the ferrule 4, and therefore, the optical fiber 1, on the connector axis.

Moreover, if during the assembling of the connector, the spherical lens 14 should engage the conical recess 6 before it is centered, the clearance 21 existing between bushing 11 and the sleeve 16 allows some movement of ferrule 4, and therefore, ensures the perfect centering between the latter and the spherical lens 14.

The presence of clearance 21 between the bushing 11 and the sleeve 16 permits moreover to save working time and costs, since the outer surfaces of the bushing 11 and of the hollow body 3, and the inner surface of sleeve 16 need not be formed with the utmost precision.

Since the surfaces of contact between the annular recess 10 and the retaining projection are not formed with high pressure and since the bushing 11 is elastic at its end 20, due to the slots 12, a displacement of the rear part 20 of bushing 11 in a direction orthogonal to the axis of said bushing 11 and consequently, of the optical fiber 1, may result.

As the front part 29 of bushing 11 and, therefore, the free end of the optical fiber 1, are perfectly centered by the retaining ring 15 and by the spherical lens 14, said displacement can lead to an inclination or slight bending of the optical fiber 1 resulting in attenuation of the optical signal transmitted.

However, the magnitude of the displacements of the rear part 20 of bushing 11 cannot in any case exceed the thickness ΔX of clearance 21 existing between bushing 11 and sleeve 16.

As the inclination of the optical fiber 1 is given by the ratio between the thickness ΔX of said clearance 21 and the length L of the bushing 11, it has been found that, to have acceptable attenuations, said ratio must be smaller than $10^{-2}$ On the other hand, in order not to lose the advantage of working with relatively low precision, the facing surfaces of the bushing 11 and of the sleeve 16, it is convenient for said ratio to be greater than $10^{-3}$.

The embodiment shown in FIG. 2 differs from the one shown in FIG. 1 in that a different manner is used to connect the ferrule and the hollow body. Only the elements differing from those shown in FIG. 1 will be described.

In the embodiment of FIG. 2, the hollow body 3a is provided in its front part 7 with an annular ridge 22 which abuts a washer 23, the outer diameter of which is smaller than the inner diameter of the sleeve 16. A spring 24, the outer diameter of which is smaller than the inner diameter of the sleeve 16, is inserted between the washer 23 and the rear end of the ferrule 4a.

Moreover, the ferrule 4a has an outer diameter slightly smaller than the inner diameter of sleeve 16, so that a clearance 6 is obtained between the ferrule 4a and the sleeve 16.

In the assembling operation, before inserting the bare portion of the optical fiber 1 in the central hole of ferrule 4a, the washer 23 and the spring 24 are inserted in the front part 7 of the hollow body 3a.

Then, after having inserted and positioned the optical fiber 1 in the conventional manner, the spherical lens 14 is inserted in the outer conical recess 6 of ferrule 4 and sleeve 16 is inserted on the whole unit and is moved towards the rear part 8 of the hollow body 3a until the spring 24 is compressed.

The positioning of the optical fiber in the focus of the lens takes place according to already known optical systems.

After positioning, the sleeve 16 and the hollow body 3a are secured to each other, in the zone indicated with arrow B, by a pressure exerted with clamping pliers.

Also in this case, the accurate processing of the inner surface of the coupling tube 18 and of the outer surface of the sleeve 16 ensures the perfect alignment of sleeve 16 inside said tube 18.

Moreover, the accurate processing of the conical surfaces of the retaining ring 15 and of the outer conical recess 6 ensures the perfect centering of the spherical lens 14 and this, on its turn, ensures the perfect centering of the ferrule 4a on the connector axis.

Clearance 26, permitting some movement of the ferrule 4a, prevents misalignment between the spherical lens 14 and the ferrule 4a, whereas the spring 24, keeping the ferrule 4a pressed against the spherical lens 14 which presses against the retaining ring 15, prevents said ferrule 4a and consequently the optical fiber 1, from suffering any inclination or bending.

It will be apparent that the invention achieves the purposes described. In fact, the presence of a clearance between the outer surface of the ferrule and the inner surface of the sleeve does not involve the need of processing these surfaces with extreme accuracy and consequently permits considerable savings in working times and costs.

Moreover, the accurate processing of the inner surface of the coupling tube, of the outer surface of the sleeve, of the surface of the conical retaining ring of the sleeve, and of the surface of the outer conical recess of the ferrule, leads to the result that, contrary to what happened in prior art connectors, the coupling tube centers the sleeve, the conical retaining ring of the sleeve centers the spherical lens, and the latter centers the ferrule, and therefore, the optical fiber on the connector axis. Moreover, the length of the ferrule or the presence of the spring prevent such bending of the optical fiber which would prejudice a good optical connection of the connector.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. An expanded beam optical fiber connector comprising:
   a hollow cylindrical sleeve having a conical seat therewithin and at one end thereof, said seat having a central opening therein and facing toward the opposite end of said sleeve;
   a hollow cylindrical body for receiving an optical fiber within and secured to said sleeve, said body having an end spaced from said seat;
   a cylindrical optical fiber supporting element within said sleeve intermediate said one end of said sleeve and said end of said body, said supporting element having a central bore for receiving an optical fiber therein and having a conical seat around said bore at the end thereof near said one end of said sleeve, the last-mentioned said conical seat facing and being spaced from the first-mentioned said conical seat and said supporting element being without a rigid connecting with said sleeve and said body and having an exterior diameter less than the interior diameter of said sleeve to provide a clearance between the exterior surface of said supporting element and the interior surface of said sleeve which permits said supporting element to move transversely of the axis of said sleeve;
   elastic means interconnecting said supporting element and said hollow cylindrical body and permitting said supporting element to move transversely of the axis of said sleeve; and
   a spherical lens mounted between and engaging the first-mentioned said conical seat and the second-mentioned said conical seat
whereby the centering between the spherical lenses and the optical fiber ends is automatically obtained through the elasticity of the connection of the hollow cylindrical body to the supporting element.

2. A connector as set forth in claim 1 further comprising a tube surrounding and slidably receiving a portion of said sleeve adjacent said one end thereof and means for securing said sleeve to said tube.

3. A connector as set forth in claim 1 wherein said supporting element is a ferrule.

4. A connector as set forth in claim 3 wherein said elastic means is spring means intermediate and acting between said ferrule and said body for urging said ferrule toward said spherical lens.

5. A connector as set forth in claim 4 wherein said body has an annular ridge and a washer is intermediate said ridge and said spring means, said spring means and said washer having an exterior diameter less than the interior diameter of said sleeve.

6. A connector as set forth in claim 1 wherein said supporting element is a ferrule surrounded by a bushing.

7. A connector as set forth in claim 6 wherein the ratio of the radial thickness of said clearance to the axial length of said bushing is less than $10^{-2}$.

8. A connector as set forth in claim 6 wherein the ratio of the radial thickness of said clearance to the axial length of said bushing is greater than $10^{-3}$.

9. A connector as set forth in claim 6 wherein said bushing is secured to said body.

10. A connector as set forth in claim 9 wherein said body has an annular recess and said bushing has elastic fingers with projections which extend into said recess, said fingers providing said elastic means interconnecting said supporting element and said body.

* * * * *

UNITED STATES PATENT AND TRADEMARK OFFICE
CERTIFICATE OF CORRECTION

PATENT NO. : 4,889,399

DATED : December 26, 1989

INVENTOR(S) : Mariani et al

It is certified that error appears in the above-identified patent and that said Letters Patent is hereby corrected as shown below:

```
Col. 1, line 5, insert "This" before "application";
Col. 1, line 7, "4,846,594" should read --4,846,544;
Col. 3, line 13, after "fiber" insert --1--;
Col. 4, line 15, after "10⁻²" insert a period (.);
Col. 4, line 33, change "6" to --26--;
Col. 5, line 45, "connecting" should read --connection--.
```

Signed and Sealed this

Eighth Day of January, 1991

*Attest:*

HARRY F. MANBECK, JR.

*Attesting Officer*  *Commissioner of Patents and Trademarks*